United States Patent
Ditto et al.

(10) Patent No.: US 7,415,683 B2
(45) Date of Patent: Aug. 19, 2008

(54) METHOD AND APPARATUS FOR A CHAOTIC COMPUTING MODULE

(75) Inventors: William L. Ditto, Gainesville, FL (US); Krishnamurthy Murali, Chennai (IN); Sudeshna Sinha, Chennai (IN)

(73) Assignees: University of Florida Research Foundation, Inc., Gainesville, FL (US); Control Dynamics, Inc., Bellevue, WA (US)

( * ) Notice: Subject to any disclaimer, the term of this patent is extended or adjusted under 35 U.S.C. 154(b) by 225 days.

(21) Appl. No.: 11/304,125

(22) Filed: Dec. 15, 2005

(65) Prior Publication Data
US 2006/0091905 A1    May 4, 2006

Related U.S. Application Data

(63) Continuation of application No. 10/680,271, filed on Oct. 7, 2003, now Pat. No. 7,096,437.

(51) Int. Cl.
G06F 17/50 (2006.01)
(52) U.S. Cl. .................. 716/2; 716/1; 716/6; 716/16
(58) Field of Classification Search ............ 716/1, 716/2, 6, 16
See application file for complete search history.

(56) References Cited

U.S. PATENT DOCUMENTS

| | | |
|---|---|---|
| 3,473,160 A | 10/1969 | Wahlstrom |
| 5,260,610 A | 11/1993 | Pedersen et al. |
| 5,291,555 A | 3/1994 | Cuomo et al. |
| 5,745,655 A | 4/1998 | Chung et al. |
| 5,809,009 A | 9/1998 | Matsuoka et al. |
| RE35,977 E | 12/1998 | Cliff et al. |
| 6,025,735 A | 2/2000 | Gardner et al. |
| 6,876,232 B2 | 4/2005 | Yoo |
| 7,068,069 B2 | 6/2006 | Fujita |
| 2004/0036636 A1 | 2/2004 | Mai et al. |

OTHER PUBLICATIONS

Murali et al., "Realization of the fundamental NOR gate using a chaotic circuit," Physical Review 68:1-5, 2003.
Murali et al., "Implementation of NOR Gate by a Chaotic Chua's Circuit," Unpublished.
Munakata et al., "Chaos Computing: Implementation of Fundamental Logical Gates by Chaotic Elements," IEEE Transactions on Circuits and Systems-I: Fundamental Theory and Applications 49:1629-1633, 2002.
Murali et al., "Experimental Chaos Computing," Submitted to IEEE Trans. on Circuits and Systems, in 2003.

*Primary Examiner*—Thuan Do
(74) *Attorney, Agent, or Firm*—Jon A. Gibbons; Fleit Gibbons Gutman Bongini & Bianco P.L

(57) ABSTRACT

A logic gate array for implementing logical expressions is provided. The array includes a dynamically configurable logic gate having a chaotic updater for causing the logic gate to alternately operate as one of a several different logic gate types, the dynamically configurable logic gate alternating from operating as one logic gate type to a different logic gate type in response to one or more reference signals. The array also includes one or more additional logic gates.

20 Claims, 4 Drawing Sheets

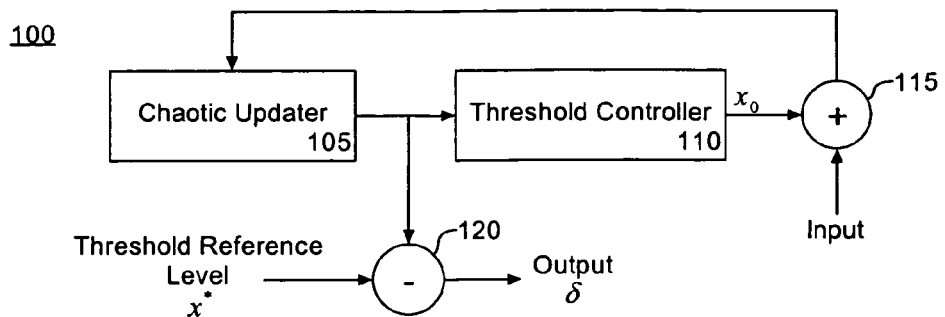
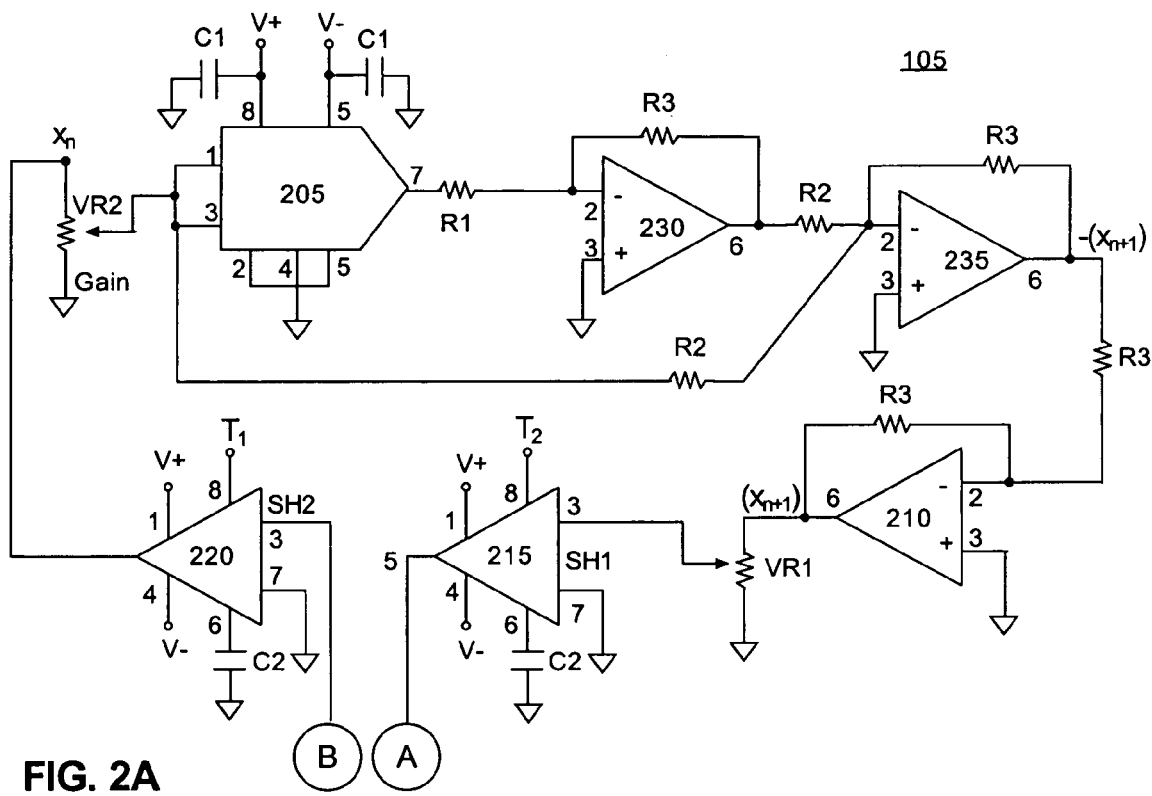
FIG. 2A
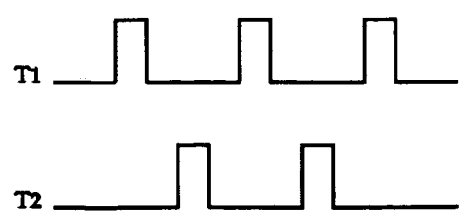
FIG. 2B

METHOD AND APPARATUS FOR A CHAOTIC COMPUTING MODULE

CROSS REFERENCE TO RELATED APPLICATIONS

This application is a continuation of and, accordingly, claims the benefit of U.S. patent application Ser. No. 10/680,271, filed in the U.S. Patent and Trademark Office on Oct. 7, 2003, and issued as U.S. Pat. No. 7,096,437 on Aug. 22, 2006.

BACKGROUND OF THE INVENTION

1. Technical Field

This invention relates to the field of dynamic computing and, more particularly, to a chaotic computing architecture for logic gates.

2. Description of the Related Art

Conventional computing systems rely upon timed operations and Boolean algebra to perform calculations. That is, the flow and processing of signals within conventional computing systems is under the control and coordination of a timing source such as a signal from a system clock. With the passing of each clock cycle, signals can be processed, typically using various combinations of logic gates to implement one or more Boolean algebraic functions.

Conventional computing systems also are static in nature and lack a flexible computing architecture. Within static computing systems, the various hardware components of the computing system cannot be reconnected or reconfigured during operation. For example, the functionality of hardware components such as logic gates cannot be changed once the component is fabricated. Moreover, once a plurality of components or logic gates are organized to form a data processing system or particular Boolean function, the components become fixed in circuitry. This is the case whether the function is implemented as a series of discrete components or on a silicon chip. In either case, the structure of the resulting circuit cannot be reconfigured or reordered into a different design.

Some computing modules, however, can be reconfigured to a limited degree. For example, field programmable gate arrays provide a limited degree of flexibility with respect to reconfiguration. One class of FPGA, referred to as a one-time configurable architecture, can be programmed one time by using fuses and antifuses as switches to make or break circuit connections. Another class of FPGA, referred to as a multi-time configurable architecture, can be adjusted to implement different architecture configurations each time the device is used.

Still another class of FPGA allows for hardware to evolve during the course of operation of a design. Such FPGA's are referred to as having dynamic architectures, and more specifically as having dynamic rewire architectures. For example, conventional dynamic FPGA's can include uncommitted logic cells and routing resources whose functions and interconnections are determined by user-defined configuration data stored in static random access memory (RAM). The static RAM can be modified at run-time, thereby allowing the configuration for some part of the chip to be altered while other circuits operate without interruption. Other embodiments include microcontrollers which allow for rerouting of data within the FPGA.

In any case, while the present state of electronic design has begun to develop dynamic computing architectures, such efforts have been limited to simply redirecting signal flows or "rewiring" devices or components such as FPGA's.

SUMMARY OF THE INVENTION

The inventive arrangements disclosed herein provide a method, system, and apparatus for emulating different logic gates. Using a control mechanism, the present invention can emulate the functionality of any one of several different logic gates. For example, a given logic gate structure can function as one type of logic gate and then begin functioning as a different type of logic gate during operation. Accordingly, the inventive arrangements disclosed herein can be combined to form more complex systems. Notably, not only can the functionality of the different individual gate structures be changed dynamically during operation, but the functionality of the larger system also can be changed.

One aspect of the present invention can include a dynamically configurable logic gate. The logic gate can include a controller configured to provide a first threshold reference signal and an adder configured to sum the first threshold reference signal and at least one input signal to generate a summed signal. The logic gate further can include a chaotic updater configured to apply a nonlinear function to the summed signal and a subtractor configured to determine an output signal by taking a difference between a second threshold reference signal and the processed summed signal from the chaotic updater. The logic gate can operate as one of several different logic gates responsive to adjusting at least one of the threshold reference signals.

For example, one or more of the reference signals can be adjusted so that the logic gate operates as an "and" (AND) logic gate. Still, one or more of the reference signals can be adjusted such that the logic gate operates as an "or" (OR) logic gate, an "exclusive or" (XOR) logic gate, or a "not" (NOT) logic gate. The difference signal determined by the subtractor can serve as the output signal of the logic gate.

Another aspect of the present invention can include a method of changing the functionality of a dynamically configurable logic gate. The method can include generating a first threshold reference signal and adding the first threshold reference signal and at least one input signal to generate a summed signal. A nonlinear function can be applied to the summed signal. A difference can be taken between a second threshold reference signal and the processed summed signal. The operation of the logic gate can be changed to function as one of several different logic gates responsive to adjusting at least one of the threshold reference signals.

For example, the operation of the logic gate can be altered to function as an AND logic gate, an OR logic gate, an XOR logic gate, or a NOT logic gate. The difference signal can be the output of the logic gate.

Yet another aspect of the present invention can include a system for implementing a logical expression. The system can include a first dynamically configurable logic gate and at least a second dynamically configurable logic gate. Each of the dynamically configurable logic gates can operate as one of a plurality of different logic gate types according to at least one provided reference signal.

The logical expression implemented by the system can be altered responsive to modifying at least one of the reference signals provided to at least one of the dynamically configurable logic gates. Each dynamically configurable logic gate can receive a separate or individual reference signal, or each can receive a same reference signal. The first and second dynamically configurable logic gates can be implemented as chaotic logic gates.

BRIEF DESCRIPTION OF THE DRAWINGS

There are shown in the drawings embodiments which are presently preferred, it being understood, however, that the invention is not limited to the precise arrangements and instrumentalities shown.

FIG. 1 is a schematic diagram illustrating a high level circuit architecture for a chaotic logic gate in accordance with the inventive arrangements disclosed herein.

FIG. 2A is a schematic diagram illustrating an exemplary circuit implementation of a chaotic updater as shown in FIG. 1.

FIG. 2B is a timing graph illustrating exemplary timing pulses that can be used to drive components of the chaotic updater of FIG. 2A.

DETAILED DESCRIPTION OF THE INVENTION

Figure 3:
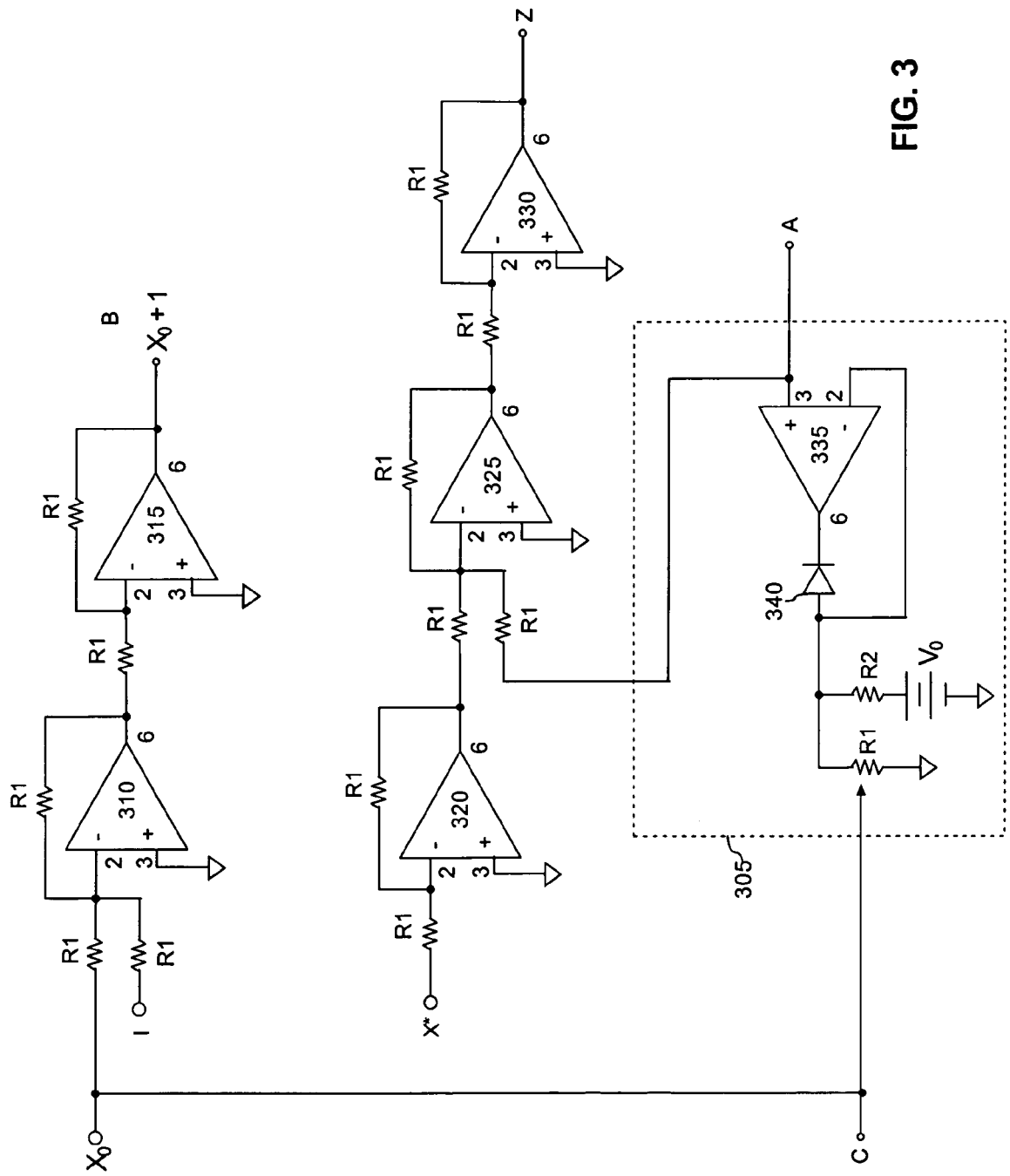
FIG. 3 is a schematic diagram illustrating an exemplary circuit implementation of the threshold controller, adder, and subtractor of the chaotic logic gate of FIG. 1.

The present invention provides a chaotic logic gate method, system, and apparatus that can be configured to function as any of a variety of different logic gates such as an "and" (AND) gate, an "or" (OR) gate, an "exclusive or" (XOR) gate, and a "not" (NOT) gate. The functionality of the chaotic logic gate can be altered by changing one or more reference voltages provided to the gate. Accordingly, a chaotic logic gate in accordance with the inventive arrangements disclosed herein, for example, can function as one type of gate, such as an AND logic gate, and during operation be instructed to begin operating or functioning as another type of logic gate, such as an OR logic gate.

Table 1 below illustrates a truth table of basic operations. For example, column 3 illustrates the function of an AND gate given inputs $(I_1, I_2)$, column 4 shows the function of an OR gate given inputs $(I_1, I_2)$, and column 5 shows the function of an XOR gate given inputs $(I_1, I_2)$. The second portion of Table 1 illustrates the operation of a NOT gate given input $I_1$.

TABLE 1

| $I_1$ | $I_2$ | AND | OR | XOR | I | NOT |
|---|---|---|---|---|---|---|
| 0 | 0 | 0 | 0 | 0 | 0 | 1 |
| 0 | 1 | 0 | 1 | 1 | 1 | 0 |
| 1 | 0 | 0 | 1 | 1 | | |
| 1 | 1 | 1 | 1 | 0 | | |

A chaotic logic gate can have an initial state represented by a value of x. In accordance with the inventive arrangements disclosed herein, each of the basic logic gate operations: AND, OR, NOT and XOR, involve the following three steps:

1. Inputs. $x \to x_0 + X_1 + X_2$ for the AND, OR, and XOR operations; $x \to x_0 + X$ for the NOT operation, where $x_0$ represents the initial state of the system, $X=0$ when $I=0$, and $X=\delta$ when $I=1$.
2. Chaotic update. $x \to f(x)$, where $f(x)$ is a chaotic function.
3. Threshold. To obtain output Z: $Z=0$ if $f(x) \leq x^*$ and $Z=f(x)-x^*$ if $f(x) > x^*$, where $x^*$ is the threshold. This is interpreted as logic output 0 if $Z=0$ and logic output 1 if $Z=\delta$.

According to one embodiment of the present invention, the input and output can have equivalent definitions such that one unit is the same quantity for input and output as well as for various logical operations. This requires that the constant $\delta$ assumes the same value throughout a network. Such a configuration allows the output of one chaotic module functioning as a gate to be coupled to another chaotic module, also functioning as a particular gate, to form gate arrays for implementing compounded logic operations.

Given a dynamics $f(x)$ to be used within a physical device, the values of threshold and initial state signals that satisfy the conditions derived from the truth table to be implemented must be determined. Table 2 below illustrates the necessary conditions to be satisfied by a chaotic computing element in order to implement the logical operations AND, OR, XOR, and NOT. The symmetry of inputs reduces the four conditions in the truth table illustrated in Table 1 to three distinct conditions, where rows two and three of Table 1 can be combined and represented by condition two in Table 2.

TABLE 2

| Operation | AND | OR | XOR | NOT |
|---|---|---|---|---|
| Condition 1 | $f(x_0) \leq x^*$ | $f(x_0) \leq x^*$ | $f(x_0) \leq x^*$ | $f(x_0) - x^* = \delta$ |
| Condition 2 | $f(x_0 + \delta) \leq x^*$ | $f(x_0 + \delta) - x^* = \delta$ | $f(x_0 + \delta) - x^* = \delta$ | $f(x_0 + \delta) \leq x^*$ |
| Condition 3 | $f(x_0 + 2\delta) - x^* = \delta$ | $f(x_0 + 2\delta) - x^* = \delta$ | $f(x_0 + 2\delta) \leq x^*$ | |

Table 3 below shows the exact solutions of the initial $x_0$ and threshold $x^*$ which satisfy the conditions in Table 2 when $f(x)=4ax(1-x)$ with parameter $a=1$. The constant $\delta=\frac{1}{4}$ is common to both input and output and to all logical gates.

TABLE 3

| Operation | AND | OR | XOR | NOT |
|---|---|---|---|---|
| $x_0$ | 0 | 1/8 | 1/4 | 1/2 |
| $x^*$ | 3/4 | 11/16 | 3/4 | 3/4 |

FIG. 1 is a schematic diagram illustrating a high level circuit architecture 100 for a chaotic logic gate in accordance with the inventive arrangements disclosed herein. As shown, the chaotic logic gate can include a chaotic updater 105, a threshold controller 110, an adder 115, and a subtractor 120. The threshold controller 110 provides a reference voltage of $x_0$ as an output. The reference voltage $x_0$ is provided to the adder 115. The adder can sum the reference voltage signal received from the threshold controller 110 as well as any received inputs. For example, the adder 115 can receive logic level inputs of I, where $I=I_1+I_2$. The summed signal is provided as an input to the chaotic updater 105.

The chaotic updater 105 implements a dynamics function denoted as $f(x)$. For example, according to one embodiment of the present invention, the chaotic updater 105 can implement the function $f(x)=4ax(1-x)$, where $a=1$. Thus, the chaotic updater 105 can be implemented as a one dimensional logistic map iteration. Given a dynamics $f(x)$ corresponding to a physical device, the values of threshold and initial state satisfying the conditions derived from the truth table to be implemented must be determined. Still, those skilled in the art will recognize that other functions also can be used, including, but not limited to, continuous time chaotic functions.

The chaotic updater 105 processes the incoming summed signal and generates $x_{n+1}$. The chaotic updater 105 applies $f(x)$ to the summed signal, the result of which, $x_{n+1}$, can be provided to the subtractor 120. The subtractor 120 can determine a difference signal between the $x_{n+1}$ signal and the x* signal. The x* signal is another reference signal provided to the circuit architecture. The resulting difference signal is provided as the logic level output signal.

FIG. 2A is a schematic diagram illustrating an exemplary circuit implementation of the chaotic updater 105 depicted in FIG. 1. In the circuit implementation, $x_{n-1}$, $x_n$, and $x_{n+1}$ denote voltages normalized to a source voltage of ±10V. For example, in one embodiment of the present invention, the voltage sources can be normalized to ±10V. Still, those skilled in the art will recognize that any suitable voltage source can be used. Accordingly, the present invention is not limited to operating with voltage sources of ±10V.

An analog multiplier 205 is used as a squarer to produce an output voltage for a given $x_n$ signal received as an input. The multiplier can be implemented, for example, using an analog multiplier integrated circuit (IC). For instance, an AD633 IC by Analog Devices, Inc. of Norwood, Mass. can be used. The analog multiplier can be used as a squarer to produce an output voltage of $x_n^2/V$ for a given $x_n$ as input.

By using a suitable inverting amplifier, inverting summing amplifier, and a sign-changer, which can be realized with op-amps 230, 235, and 210, a voltage proportional to $4x_n(1-x_n)$ or $x_{n+1}$ is available at the output of op-amp 210. A variable resistor VR1 is employed to control the parameter α from 0 to 1 in the logistic map. The output voltage of op-amp 210 becomes a new input voltage to the analog multiplier 205 after passing through two sample-and-hold circuits 215 and 220 (SH1 and SH2), provided terminals A and B are connected to their respective counterpart terminals of the remainder of the chaotic logic gate architecture disclosed herein. According to one embodiment of the present invention, the sample-and-hold circuits 215 and 220 can be constructed using LF398 or ADG412 IC's.

Exemplary resistance values for the embodiment of the chaotic updater 105 shown in FIG. 2A can be R1=10 kilo-ohm, R2=25 kilo-ohm, and R3=100 kilo-ohm. Both variable resistors VR1 and VR2 can have values of 10 kilo-ohm. The capacitive values for the system can be as follows: C1=0.1 micro-Farad and C2=0.01 micro-Farad. Op-amps 230, 235, and 210 can be implemented as LM741 or AD712 op-amps.

FIG. 2B is a timing graph illustrating exemplary timing pulses that can be used to drive the sample and hold circuits of 215 and 220 of FIG. 2A. The sample and hold circuits can be triggered by suitable delayed timing pulses T1 and T2 as shown. The timing pulses typically are generated from a clock generator providing a delay of feedback. According to one embodiment, a clock rate of 5 kHz or 10 kHz can be used. It should be appreciated, however, that any of a variety of suitable clock rates can be used to drive the sample and hold circuits.

FIG. 3 is a schematic diagram illustrating an exemplary circuit implementation of the threshold controller, adder, and subtractor of the chaotic logic gate implementation of FIG. 1. That is, when terminals A and B of the circuit implementation illustrated in FIG. 3 are connected with terminals A and B respectively of FIG. 2A, the union of the two circuit implementations form an embodiment of the chaotic logic gate of FIG. 1. In the present configuration, the input and output variables have been normalized. In this case, for example, the input and output variables can be normalized to 10 V.

A precision clipping circuit can be used as the threshold controller. For example, as shown, the control circuit 305 can serve as the threshold controller that generates the signal $x_0$ at terminal C corresponding to the input signal $x_{n+1}$ at A under the threshold control voltage $V_0$. The input voltage I can be equal to 0 V, 0.25 V or 0.5 V corresponding to different logic gates. In the embodiment illustrated in FIG. 3, x* is another reference threshold voltage being used to produce the difference voltage and logic gate output signal δ from the $x_{n+1}$ signal. The δ signal and the input signal I determine the logic condition of the different gates.

According to one embodiment of the present invention, the circuit configuration illustrated in FIG. 3 can be implemented using μA741 model op-amps for op-amps 310, 315, 320, 325, 330, and 335. Resistance values can be set as follows: R1=100 kilo-ohm and R2=1 kilo-ohm. Diode model number IN4148 or IN34A can be used in place of diode 340.

Figure 4A:
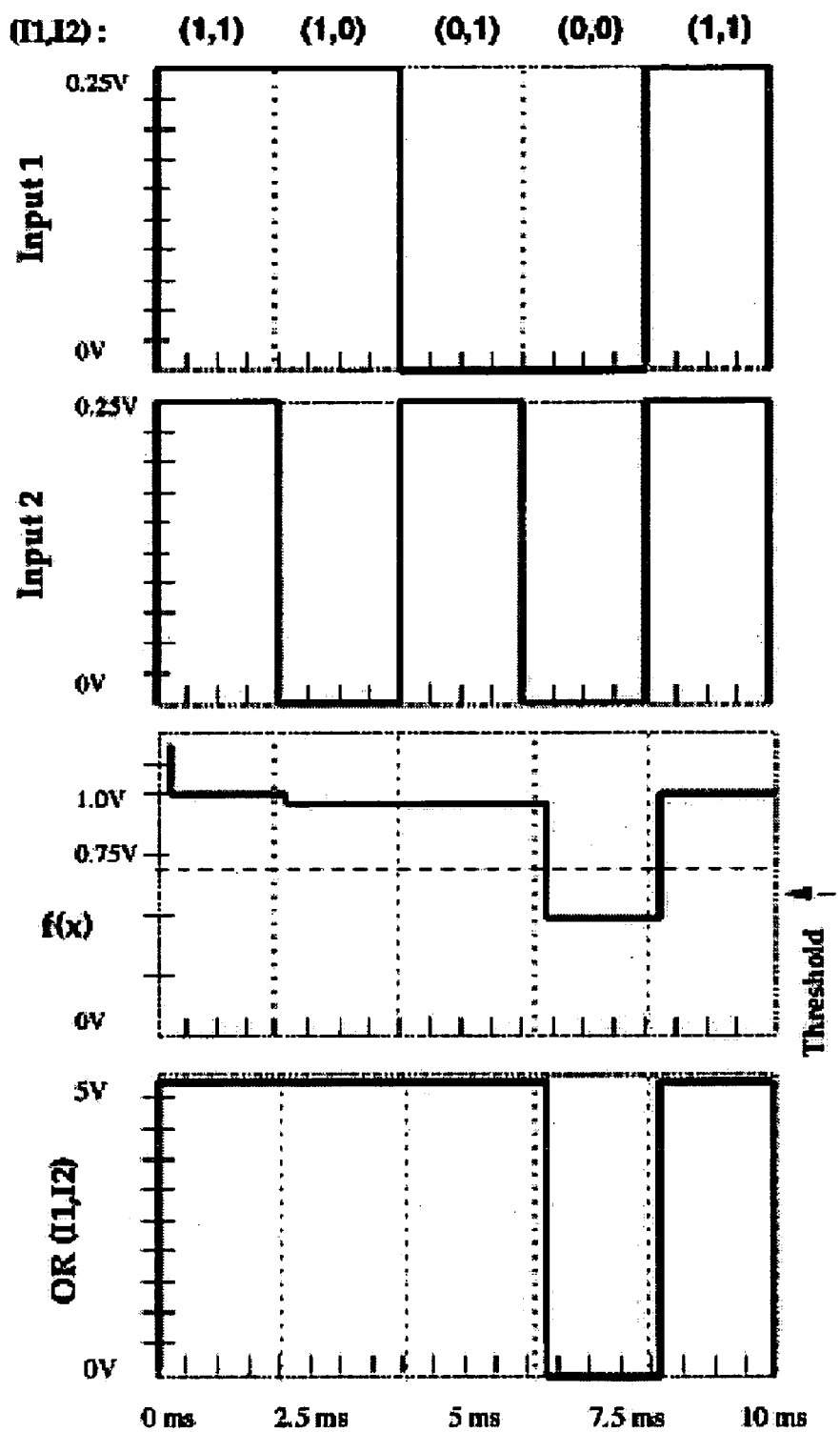
FIG. 4A is a series of timing graphs illustrating timing sequences of implementations of a representative OR gate configuration formed in accordance with the inventive arrangements disclosed herein.

FIG. 4A is a series of timing graphs illustrating timing sequences of implementations of a representative OR gate configuration formed in accordance with the inventive arrangements disclosed herein. The timing sequences of the exemplary OR gate implementation, from top to bottom, represent: (1) first input $I_1$; (2) second input $I_2$; (3) state after chaotic update $f(x)$; and (4) output obtained by thresholding.

Figure 4B:
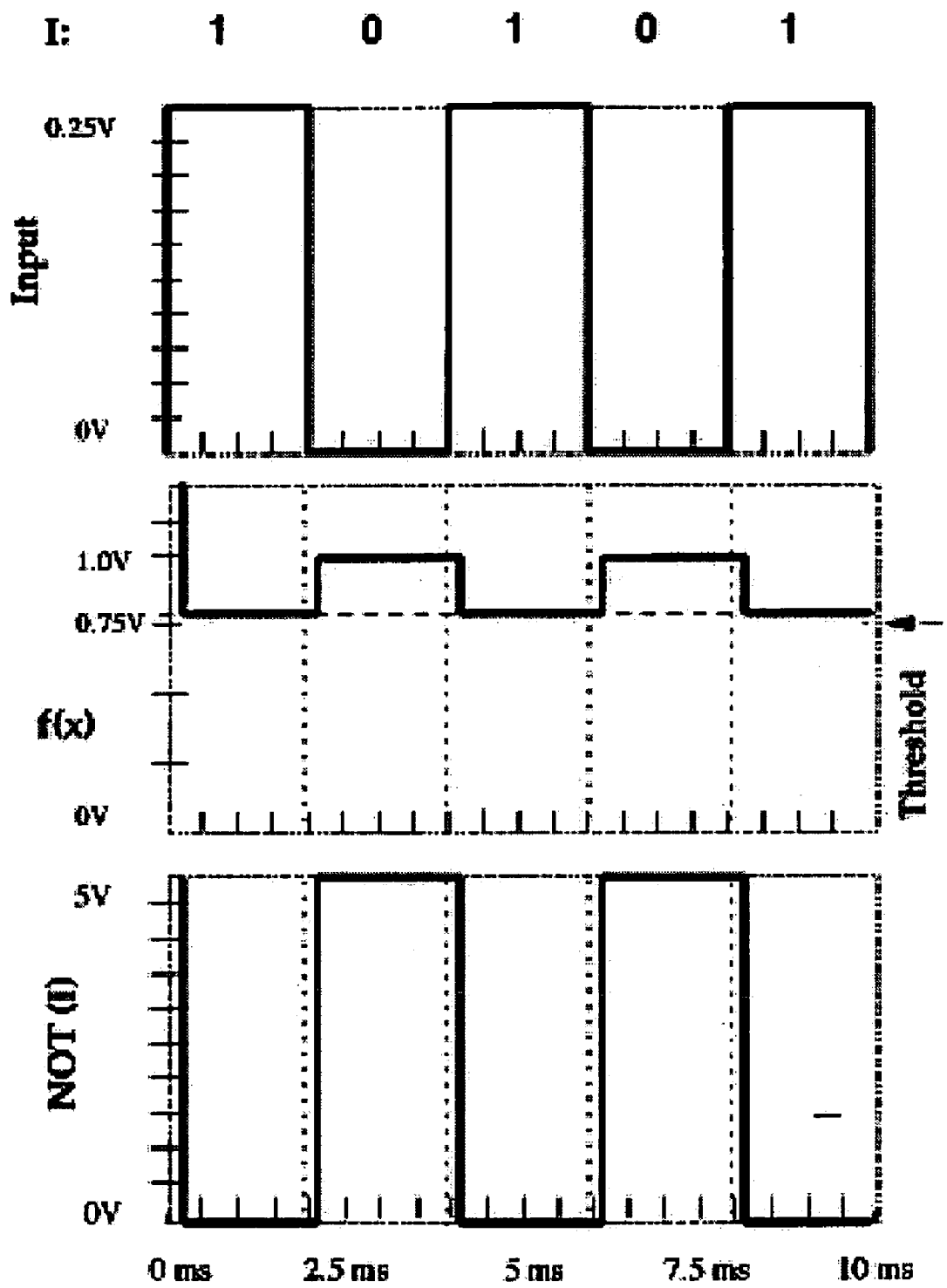
FIG. 4B is a series of timing graphs illustrating timing sequences of implementations of a representative NOT gate configuration formed in accordance with the inventive arrangements disclosed herein.

FIG. 4B is a series of timing graphs illustrating timing sequences of implementations of a representative NOT gate configuration formed in accordance with the inventive arrangements disclosed herein. The timing sequences of the exemplary NOT gate implementation, from top to bottom, represent: (1) input I; (2) state after chaotic update $f(x)$; and (3) output obtained by thresholding.

Another aspect of the present invention can include a system for implementing a logical function such as a Boolean expression. The system can include one or more dynamically configurable logic gates, for example chaotic logic gates in accordance with the inventive arrangements disclosed herein. One or more of the dynamically configurable logic gates can operate as one of a plurality of different logic gate types according to at least one provided reference signal. Notably, each dynamically configurable logic gate can receive a separate or individual reference signal, or each can receive a same reference signal. In the event that more than two dynamically configurable logic gates are included, one or more of the logic gates can receive a same reference signal and/or an individual reference signal.

Accordingly, one logic gate, a set of logic gates, or all of the logic gates within the system can change functionality according to a provided reference signal. For example, a set of logic gates can be altered to stop functioning as AND logic gates and begin functioning as OR logic gates while in operation. In another example, each logic gate can be controlled using a separate reference signal that controls only one gate. In that case, for instance, a first set of logic gates functioning as AND logic gates can be instructed to begin operating as OR logic gates, while a second set of logic gates, also functioning as AND logic gates, can be instructed to begin functioning as XOR logic gates. Regardless, the entire functionality of the system can be altered. Thus, a system designed to implement one type of Boolean expression can be modified using control signals to dynamically begin implementing a different Boolean expression.

The inventive arrangements disclosed herein have been illustrated using different examples that have incorporated specific discrete components. Those skilled in the art will recognize that such components have been provided for purposes of illustration only. Accordingly, any of a variety of different components, whether functional equivalents, variants, or alternatives of the discrete components or of the higher level components (i.e. of FIG. 1) disclosed herein, can be used. As such, the invention is not limited to the use of a particular component or set of components. Further, it should be appreciated that the present invention can be implemented as one or more discrete components or as a single larger component. The present invention also can be implemented within silicon as an integrated circuit.

As this invention can be embodied in other forms without departing from the spirit or essential attributes thereof. Accordingly, reference should be made to the following claims, rather than to the foregoing specification, as indicating the scope of the invention.

What is claimed is:

1. A logic gate array for implementing logical expressions, the logic gate array comprising:
   a plurality of logic gates, at least one of said plurality of logic gates being a dynamically configurable logic gate that operates as one of a plurality of different logic gates responsive to adjusting at least one threshold reference signal, said dynamically configurable logic gate including
      a controller configured to provide a first threshold reference signal,
      an adder configured to sum the first threshold reference signal and at least one input signal to generate a summed signal,
      a chaotic updater configured to apply a nonlinear function to the summed signal, and
      a subtractor configured to determine an output signal by taking a difference between a second threshold reference signal and the processed summed signal from said chaotic updater.

2. The logic gate array of claim 1, wherein at least one of the threshold reference signals is adjusted such that the dynamically configurable logic gate operates as an AND logic gate.

3. The logic gate array of claim 1, wherein at least one of the threshold reference signals is adjusted such that the dynamically configurable logic gate operates as an OR logic gate.

4. The logic gate array of claim 1, wherein at least one of the threshold reference signals is adjusted such that the dynamically logic gate operates as an XOR logic gate.

5. The logic gate array of claim 1, wherein at least one of the threshold reference signals is adjusted such that the dynamically configurable logic gate operates as a NOT logic gate.

6. The logic gate array of claim 1, wherein the difference signal determined by said subtractor is an output signal of said dynamically configurable logic gate.

7. A logic gate array for implementing logical expressions, the logic gate array comprising:
   a plurality of logic gates, at least one of said plurality of logic gates being a dynamically configurable logic gate that operates as one of a plurality of different logic gates responsive to adjusting at least one threshold reference signal, said dynamically configurable logic gate including
      means for generating a first threshold reference signal;
      means for adding the first threshold reference signal and at least one input signal to generate a summed signal;
      means for applying a nonlinear function to the summed signal; and
      means for determining a difference signal between a second threshold reference signal and the processed signal from said means for applying a nonlinear function to the summed signal.

8. The logic gate array of claim 7, wherein at least one of the threshold reference signals is adjusted such that the dynamically configurable logic gate operates as an AND logic gate.

9. The logic gate array of claim 7, wherein at least one of the threshold reference signals is adjusted such that the dynamically configurable logic gate operates as an OR logic gate.

10. The logic gate array of claim 7, wherein at least one of the threshold reference signals is adjusted such that the dynamically logic gate operates as an XOR logic gate.

11. The logic gate array of claim 7, wherein at least one of the threshold reference signals is adjusted such that the dynamically configurable logic gate operates as a NOT logic gate.

12. The logic gate array of claim 7, wherein the difference signal determined by said subtractor is an output signal of said dynamically configurable logic gate.

13. A logic gate array for implementing logical expressions, the array comprising:
   a first dynamically configurable logic gate having a chaotic updater for causing said first logic gate to alternately operate as one of a plurality of different logic gate types, said first logic gate alternating from operating as one logic gate type to a different logic gate type in response to at least one provided reference signal; and
   at least a second dynamically configurable logic gate having a chaotic updater for causing said second logic gate to alternately operate as one of a plurality of different logic gate types, said first logic gate alternating from operating as one logic gate type to a different logic gate type in response to at least one provided reference signal;
   wherein the logical expression implemented by the system is altered responsive to modifying at least one of the reference signals provided to at least one of said dynamically configurable logic gates.

14. The system of claim 13, wherein said first and second dynamically configurable logic gates receive the same reference signal.

15. The system of claim 13, wherein said first and second dynamically configurable logic gates receive different reference signals.

16. The system of claim 13, wherein said first and second dynamically configurable logic gates are chaotic logic gates.

17. In a logic gate array comprising at least one dynamically configurable logic gate, a method of changing the functionality of the at least one dynamically configurable logic gate, the method comprising:
   generating a first threshold reference signal;
   adding the first threshold reference signal and at least one input signal to generate a summed signal;
   applying a nonlinear function to the summed signal;
   taking a difference between a second threshold reference signal and the processed summed signal; and
   changing the operation of the at least one dynamically configurable logic gate to function as one of a plurality of different logic gates responsive to adjusting at least one of the threshold reference signals.

18. The method of claim 17, wherein at least one of said threshold reference signals is adjusted such that the dynamically configurable logic gate operates as an AND logic gate.

19. The method of claim 17, wherein at least one of said threshold reference signals is adjusted such that the dynamically configurable logic gate operates as an OR logic gate.

20. The method of claim 17, wherein at least one of said threshold reference signals is adjusted such that the logic gate operates as a NOT logic gate.

* * * * *